Patented May 14, 1940

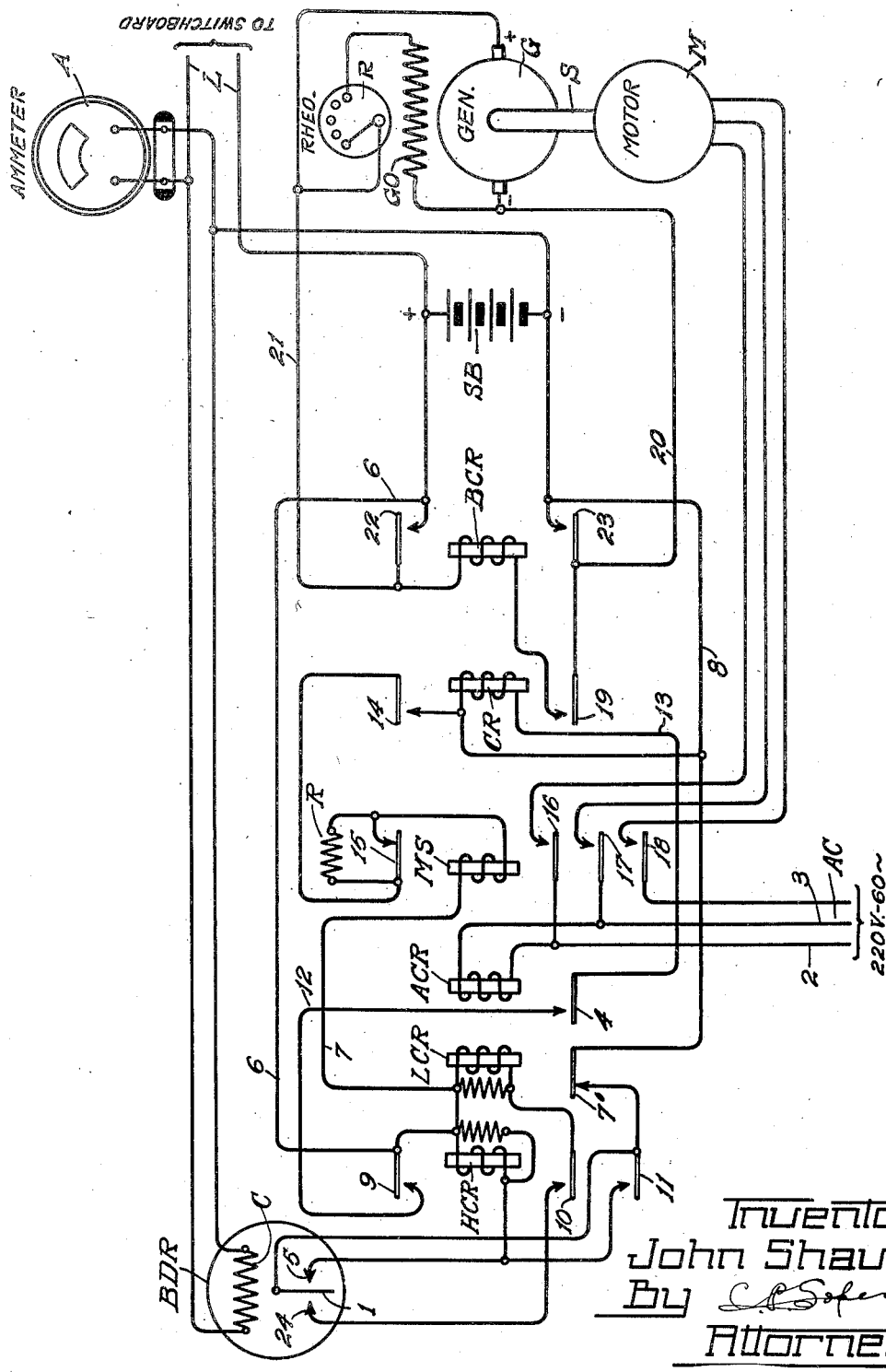

2,200,376

UNITED STATES PATENT OFFICE 2,200,376

GENERATOR CONTROL SYSTEM

John Shaver, Chicago, Ill., assignor to Kellogg Switchboard and Supply Company, Chicago, Ill., a corporation of Illinois Application April 21, 1938, Serial No. 203,270

4 Claims. (Cl. 171—314)

My invention relates to a control circuit for a generator used for charging a storage battery. The use of a storage battery, as a source of power in telephone exchanges, has become the accepted practice. The storage battery is unequalled as a dependable source of power for this service if provision is made for keeping the battery in a properly charged condition. The floating method of charge in which a generator of suitable capacity is connected in parallel with the battery and operated continuously, is in general use at the present time.

In telephone exchanges the power load is much heavier during the day than it is during the night time. If the generator is kept running continuously through the night under practically no load, a glaze tends to develop on the commutator, and this glaze may reduce the generator voltage below the proper floating limit; therefore, it has been necessary to have an attendant disconnect the generator from the circuit in the evening and use the storage battery, alone, as a source of power during the night. The attendant must then return in the morning to connect the generator into the circuit to recharge the battery to its former level. In some of the smaller exchanges, the services of an attendant are not always available and, therefore, such a system is inconvenient and unnecessarily expensive.

My invention is designed to overcome the necessity of having an attendant at the station to control the generator. The above difficulty has been overcome by furnishing a completely automatic circuit in which the generator is disconnected from the load during the periods of slight battery drain and reconnected when the load exceeds a certain point.

A feature of my invention is the provision of means in a battery-charging circuit for automatically connecting and disconnecting the generator into a circuit at certain times.

Another feature of my invention is the provision of means in a floating charge battery system for disconnecting the generator from the circuit during periods of low battery drain.

The drawing shows a schematic circuit arrangement of my invention, and the apparatus disclosed comprises a motor M and a generator G connected to, and driven by the motor through shaft S. The coil GO is the generator field coil and rheostat R controls the amount of current generated. An ammeter A is connected in a circuit joining the negative side of the storage battery SB to one of the conductors L which lead to the load at the switchboard not shown on the drawing.

The winding C of a battery drain response relay BDR is connected in parallel with the ammeter. This relay is designed to move the contact 1 in one direction or the other, depending upon the amount of current flowing through the coil C. With the battery drain at a predetermined point (say 8 amperes), the contact 1 of relay BDR will swing to the right, as shown on the drawing, and make contact on the "high" contact side. The flow of current is considered high and provision is made for including the generator in the supply circuit when 8 amperes of current is required to operate the apparatus at the exchange. Should the battery drain discharge fall below 6 amperes, which it will do during slack periods, the contact 1 of the relay BDR will move to the left with reference to the drawing to cause the disconnection from the supply circuit of the alternating current. Relay HCR is provided and is maintained energized so long as the proper amount of current is being supplied by the 220 volt, 60-cycle, three-phase supply circuit. A high contact relay HCR and a low contact relay LCR are responsive to the closure of the high and low contact circuits through the armature of the relay BDR. A motor start relay MS is provided and when it is energized, due to the closing of the contacts of the high contact relay HCR, it establishes an actuating circuit for the electric motor M which operates the generator G to charge the storage battery SB and supply current to the load. A control relay CR controls the energization of a battery charging relay BCR, which when energized connects the generator output to the storage battery SB.

The operation of my system is as follows: As long as the A. C. supply circuit is furnishing the proper amount of current the relay ACR will be energized by current flowing from conductor 2 which leads to the A. C. supply through the winding of the relay ACR and conductor 3 back to the source of current. Relay ACR is energized by the current flowing over this circuit and closes its contact 4. If the battery drain is more than a predetermined amount, i. e., 8 amperes, the contact 1 of relay BDR will swing to the right to engage contact 5 and close an energizing circuit for the high contact relay HCR. This relay will be energized by current flowing from the positive side of the storage battery SB through conductor 6, the winding of the relay HCR, contacts 5 and 1 of relay BDR, closed contact 7' of relay LCR, conductor 8 to the negative side of storage battery SB. The relay HCR closes its contacts 9, 10, and 11. The closure of contact 11 establishes a locking circuit for the relay HCR and removes the relay from the control of the battery drain response relay BDR and causes it to remain energized until the battery drain falls to a predetermined low point. The closure of contact 9 of relay HCR establishes an energizing circuit for control relay CR which is operated by current flowing from the positive side of storage battery SB, through conductor 6, closed contact 9 of HCR, conductor 12, closed contact 4 of relay ACR, conductor 13, the winding of control relay CR and conductor 8 to the negative side of the storage battery SB. Relay CR energizes and closes its contact 14 to establish an energizing circuit for the motor start relay MS which relay will operate by current flowing from the positive side of storage battery SB, conductors 6 and 7, the winding of motor start relay MS, normal contact 15 of MS, alternate contact 14 of CR, conductor 8 to the negative side of storage battery SB. The relay MS will operate and close its contacts 16, 17, and 18 to connect the alternating current supply source to the motor M which will be operated to drive the generator G to generate direct current. The relay MS opens contact 15 and causes the resistance R to be included in a series circuit with the winding of the relay MS to reduce the amount of current flowing through the winding to prevent its burning out. The closing of contact 19 of control relay CR completes a circuit for the battery charging circuit relay BCR. This circuit can be traced from the winding of the relay BCR, closed contact 19 of CR, conductor 20, generator output coil GO, conductor 21 to the other side of the winding of relay BCR. The current generated will pass from the output circuit from the brushes through the coil of the relay BCR which will not operate until the voltage output of the generator equals the battery voltage. This is to prevent the reversal of current through the generator before the generator reaches a speed sufficient to produce the required voltage output. The battery charging relay BCR will operate and close its contacts 22 and 23 to connect the generator to the storage battery terminals and to the battery drain circuit. At this time the generator and storage battery are both connected to the load and supply current to operate the apparatus at the telephone exchange.

When the telephone exchange apparatus draws a load of only 6 amperes, the battery drain response relay BDR will cause the needle 1 to disengage the contact 5 and engage the contact 24. This will establish an energizing circuit for the low contact relay LCR which circuit may be traced from the positive side of the storage battery SB, conductor 6, through the winding of relay LCR, alternate contact 10 of relay HCR, closed contacts 24 and 1, normal contact 7' of relay LCR and conductor 8 to the negative side of storage battery SB. The relay LCR will open its contact 7' to open the locking circuit of the high contact relay HCR which relay will deenergize and restore 9, 10, and 11 to normal. The opening of contact 9 interrupts the energizing circuit of the control relay CR which will restore its contacts 14 and 19 to normal. Contact 14 interrupts the energizing circuit of the motor start relay MS which opens its contacts 16, 17 and 18 to disconnect the motor M from the source of alternating current. The motor M being disconnected from its supply circuit will stop and the generator G will also be stopped. The control relay CR restored contact 19 to normal and opened the energizing circuit of the battery charging relay BCR at that time. The relay BCR restores its contacts 22 and 23 to normal and thereby disconnects the storage battery SB from the generator supply leads 20 and 21 to prevent the reversal of current through the generator while it is slowing down and coming to rest.

If at any time the supply of alternating current is interrupted, the supply relay ACR will be deenergized and open contact 4. If the battery drain is low at this time, it will have no effect on the circuit. However, if the drain is high, the motor start relay will be energized, but the restoration to normal of the contact 4 of relay ACR will open the energizing circuit of the control relay CR which will in turn deenergize the motor start relay MS and the battery charging relay BCR.

Having thus described my invention, what I claim is new and desire to secure by United States Letters Patent is:

1. A generator control system comprising a variable load circuit, a storage battery for the load circuit, a generator having an output circuit for charging said battery, a battery drain response relay having a winding connected with the load circuit for actuating said relay in response to variations in said load circuit, a contact for said relay movable in one direction when the drain on the battery exceeds a predetermined amount and movable in an opposite direction when the drain on the said battery is less than a predetermined amount, a high contact relay, an energizing circuit for said high contact relay completed when said battery drain response relay contact moves in one direction, means responsive to the operation of said high contact relay for operating said generator, a battery charging relay operable when the output of said generator reaches a predetermined voltage to connect said generator output circuit to said storage battery, an energizing circuit for the battery charging relay having circuit closing means therein closed by the energizing of the high contact relay, a low contact relay, an energizing circuit for said low contact relay completed upon the movement of said movable contact in the opposite direction, and means controlled by said low contact relay for stopping said generator.

2. A generator control system comprising a variable load circuit, a storage battery for said load circuit, a generator having an output circuit for charging said battery, a motor for driving said generator, a battery drain response relay having a winding connected with the load circuit for actuating said relay in response to variations in said load circuit, a contact for said relay movable in one direction when the drain on the battery exceeds a predetermined amount and movable in a second direction when the drain on the said battery is less than a predetermined amount, a source of current, a motor start relay having contacts for connecting said source of current to said motor for operating said motor, a high contact relay, an energizing circuit for said relay completed when said battery drain response relay contact moves in one direction, contacts for said high contact relay for closing an energizing circuit for said motor start relay whereby said motor is connected to said source of current and said generator is operated, a battery charging relay operable when the output of said generator reaches a predetermined voltage and having contacts for connecting said generator output circuit with said storage battery, an energizing circuit for the battery charging relay having circuit closing means therein closed by the energizing of the high contact relay, a low contact relay, an energizing circuit for said low contact relay completed when said movable contact of the battery drain response relay moves in the said second direction, and means controlled by said low contact relay for deenergizing said motor start relay to stop said motor and said generator.

3. A generator control system comprising a variable load circuit, a storage battery connected across the load circuit, a generator having an output circuit for charging said battery, a motor for driving said generator, a drain response relay having a winding connected in series with the load circuit for actuation in response to variations in said load circuit, a contact for said relay movable in one direction when the drain of the load circuit exceeds a predetermined amount and movable in the other direction when the drain of the load circuit is less than a predetermined amount, a source of current, a motor start relay having contacts for connecting said source of current with said motor for operating said motor, a battery charging relay operable when the output of said generator reaches a predetermined voltage and having contacts for connecting said generator output circuit with said storage battery, a control relay having contacts for closing energizing circuits for the motor start relay and for the battery charging relay, a high contact relay having an energizing circuit which is completed when the drain response relay contact moves in one direction, contacts actuated by said high contact relay for closing an energizing circuit for said control relay for thereby closing energizing circuits for said motor start relay and said battery charging relay, a low contact relay, an energizing circuit for said low contact relay completed when the movable contact of the drain response relay moves in the other direction, and means controlled by said low contact relay for deenergizing said motor start relay to stop said motor and said generator.

4. A generator control system comprising a variable load circuit, a storage battery for the load circuit, a generator having an output circuit for charging said battery, a motor for driving said generator, a drain response relay having a winding connected with the load circuit for actuation in response to variations in said load circuit, a contact for said relay movable in one direction when the drain of the load circuit exceeds a predetermined amount and movable in the other direction when the drain of the load circuit is less than a predetermined amount, a source of current, means for connecting said source of current with said motor for operating said motor, a battery charging relay operable when the output of said generator reaches a predetermined voltage and having an energizing circuit and contacts for connecting said generator output circuit with said storage battery, a control relay for closing the energizing circuit for the battery charging relay and for controlling said connecting means, a high contact relay having an energizing circuit which is completed when the drain response relay contact moves in one direction, contacts actuated by said high contact relay for closing an energizing circuit for said control relay for thereby closing the energizing circuit for said battery charging relay and for starting the motor, a low contact relay, an energizing circuit for said low contact relay completed when the movable contact of the drain response relay moves in the other direction, and means controlled by said low contact relay for actuating said connecting means to stop said motor and said generator.

JOHN SHAVER.